US007567562B2

(12) United States Patent
Lee et al.

(10) Patent No.: US 7,567,562 B2
(45) Date of Patent: Jul. 28, 2009

(54) CONTENT BASED SECURE RENDEZVOUS CHAOTIC ROUTING SYSTEM FOR ULTRA HIGH SPEED MOBILE COMMUNICATIONS IN AD HOC NETWORK ENVIRONMENT

(75) Inventors: K. C. Lee, Princeton Junction, NJ (US); Hasan Timucin Ozdemir, Plainsboro, NJ (US)

(73) Assignee: Panasonic Corporation, Osaka (JP)

( * ) Notice: Subject to any disclaimer, the term of this patent is extended or adjusted under 35 U.S.C. 154(b) by 700 days.

(21) Appl. No.: 11/070,797

(22) Filed: Mar. 2, 2005

(65) Prior Publication Data

US 2006/0198367 A1    Sep. 7, 2006

(51) Int. Cl.
*H04L 12/28* (2006.01)
(52) U.S. Cl. ..................................... 370/389
(58) Field of Classification Search .......... 370/389; 380/277, 278, 283, 285; 455/436
See application file for complete search history.

(56) References Cited

U.S. PATENT DOCUMENTS

| | | | | |
|---|---|---|---|---|
| 6,233,601 | B1 * | 5/2001 | Walsh | 709/202 |
| 6,385,174 | B1 * | 5/2002 | Li | 370/252 |
| 6,912,657 | B2 * | 6/2005 | Gehrmann | 713/171 |
| 7,215,775 | B2 * | 5/2007 | Noguchi et al. | 380/249 |
| 7,260,720 | B2 * | 8/2007 | Yamamoto et al. | 713/169 |
| 2004/0025018 | A1 * | 2/2004 | Haas et al. | 713/168 |
| 2004/0071124 | A1 * | 4/2004 | Saffre | 370/341 |
| 2004/0083373 | A1 * | 4/2004 | Perkins et al. | 713/189 |
| 2005/0123141 | A1 * | 6/2005 | Suzuki | 380/277 |
| 2005/0141706 | A1 * | 6/2005 | Regli et al. | 380/44 |
| 2007/0091856 | A1 * | 4/2007 | Raina et al. | 370/338 |

\* cited by examiner

*Primary Examiner*—Chirag G Shah
*Assistant Examiner*—Otis L Thompson, Jr.
(74) *Attorney, Agent, or Firm*—Harness, Dickey & Pierce, PLC

(57) ABSTRACT

The originator requests information from a target by launching a receptor agent that propagates across the mobile ad hoc network to the target. Along the way, intermediate nodes retain copies of the receptor. The target adds reply information to the receptor and launches it onto the network. When the reply-bearing receptor rendezvous with a receptor copies that contain matching patterns corresponding to the reply-bearing receptor, the reply information is transferred to those receptor copies. The information transferred may be encrypted at the target, using encryption key supplied by the originator. In this way, intermediate nodes cannot access the information being propagated in the receptors that they host.

28 Claims, 3 Drawing Sheets

CONTENT BASED SECURE RENDEZVOUS CHAOTIC ROUTING SYSTEM FOR ULTRA HIGH SPEED MOBILE COMMUNICATIONS IN AD HOC NETWORK ENVIRONMENT

BACKGROUND OF THE INVENTION

The present invention relates generally to information routing. More particularly, the invention relates to information routing in ad hoc network environments where nodes are moving quickly and the network topology is changing quickly, making information transfer during roaming difficult.

Whereas much of the internet traffic today is supported by information routers deployed at fixed locations, there is growing interest in mobile networks where information must be routed among nodes that are mobile, thus constantly changing the network topology. The 802.11 wireless protocol represents one popular mechanism by which such ad hoc networks are created. However, current 802.11 protocols (e.g., 802.11a, 802.11b, 802.11g, and the like) cannot support fast roaming and topology change. Where roaming speeds exceed much over 90 kilometers per hour, the 802.11 protocols have not proven very reliable. While access points can be configured to support bridging and relay functions, such access points are not of much help in environments where they need to move from place to place frequently.

In an effort to support node mobility, a set of routing protocols known as mobile ad hoc network (MANET) was developed. However, communication errors caused by frequent changing of routing paths and fading channels has limited the bandwidth and reliability of the MANET protocols. Privacy and security issues also arise. In an open MANET where nodes participate in routing IP packets, protecting MANET nodes from denial of service attack (DOS) and eavesdropping are important concerns. As more fully explained herein, we believe a strong peer-to-peer level communication is needed.

SUMMARY OF THE INVENTION

The present invention addresses the communication issues raised by extremely fast roaming speed and randomly changing network topologies, and also addresses privacy and security concerns by use of a secure content matching rendezvous communication model. According to one aspect of the communication model, dynamically loadable and customizable interlayer routing modules called receptors are used. The routing scheme is implemented using the receptors. A mobile node can run multiple, different receptors in parallel, where the routing logic is local to each receptor rather than being embedded in a permanently located router. Different relay algorithms can be built on top of the physical and logical communication layers to support a highly flexible network topology.

According to a further aspect of the communication module, parallel pattern matching and message relay is performed. Receptors can receive input packets in parallel (such as from plural different target information sources). The receptors perform pattern matching operations to decide whether to pass the packets to neighboring nodes. In passing packets, the receptor can also decide whether to change the format or encryption of the packets. Again, this supports a highly flexible network topology where information formats and encryption protocols can be changed in an ad hoc manner to accommodate rapid and potentially random changes in the network topology.

The communication model further supports adaptive scattering of certified receptors from an originator (e.g., a user node) and gathering of responses from target nodes (e.g., servers of requested information) designed to handle the requests. The receptors propagate out or scatter across the network and contractually handle the routing of reply information blocks based on a predefined algorithm or set of algorithms. The algorithms may be configured as genetic algorithms designed to optimize the efficiency and reliability of the network. An originator can scatter more receptors in time duration and space coverage when the desired bandwidth or packet loss rates are not achieved. Thus the architecture gives the originator (e.g., a user node) the ability to control bandwidth and packet loss rate.

In accordance with the principles of the communication model in operation, the dynamically constructed receptor network will overlay on top of a wireless network. In other words, the communication model is compatible with current communication technologies and current wireless networking technologies. Receptors, in effect, serve as a vehicle by which the originator makes a request for information and by which the target information source supplies reply information in response. The receptors contain their own routing logic, and this routing logic is local to the receptor, not tied to a physical fixed-location router. This makes the communication model quite agile and able to very quickly adapt when network topology changes due to the physical movement of the nodes within which the receptors are writing.

Receptors along the path of fastest response will tend to naturally dominate the other slower receptors, thus maximizing information throughput. When a failure of one receptor occurs, other receptors will become dominant receptors along the information path (which we call the rendezvous path). Because the receptors can assume dominance when another receptor fails, packet loss rate can be minimized.

Although individual receptors are unaware of the behavior of other receptors, they collectively behave, statistically, to route message traffic from originator to target and back to originator in a highly efficient manner that may involve several information paths being exploited at the same time. Because the network is mobile and potentially changing rapidly in a random fashion, there is no guarantee that all information paths will remain viable throughout the entire information request and reply transaction. This does not matter, however, because the receptors each contain routing logic local to that receptor, such that each receptor is able to operate independent of the others.

Source and destination information is not used for routing. Rather, a given receptor merely communicates with its nearest neighbor receptors, relying upon the embedded routing logic to ensure the message reaches its desired destination. No unsolicited messages are relayed and no data about the reply information (information payload) is revealed to the node that is hosting the receptor. This allows the communication model to achieve high levels of security and privacy.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
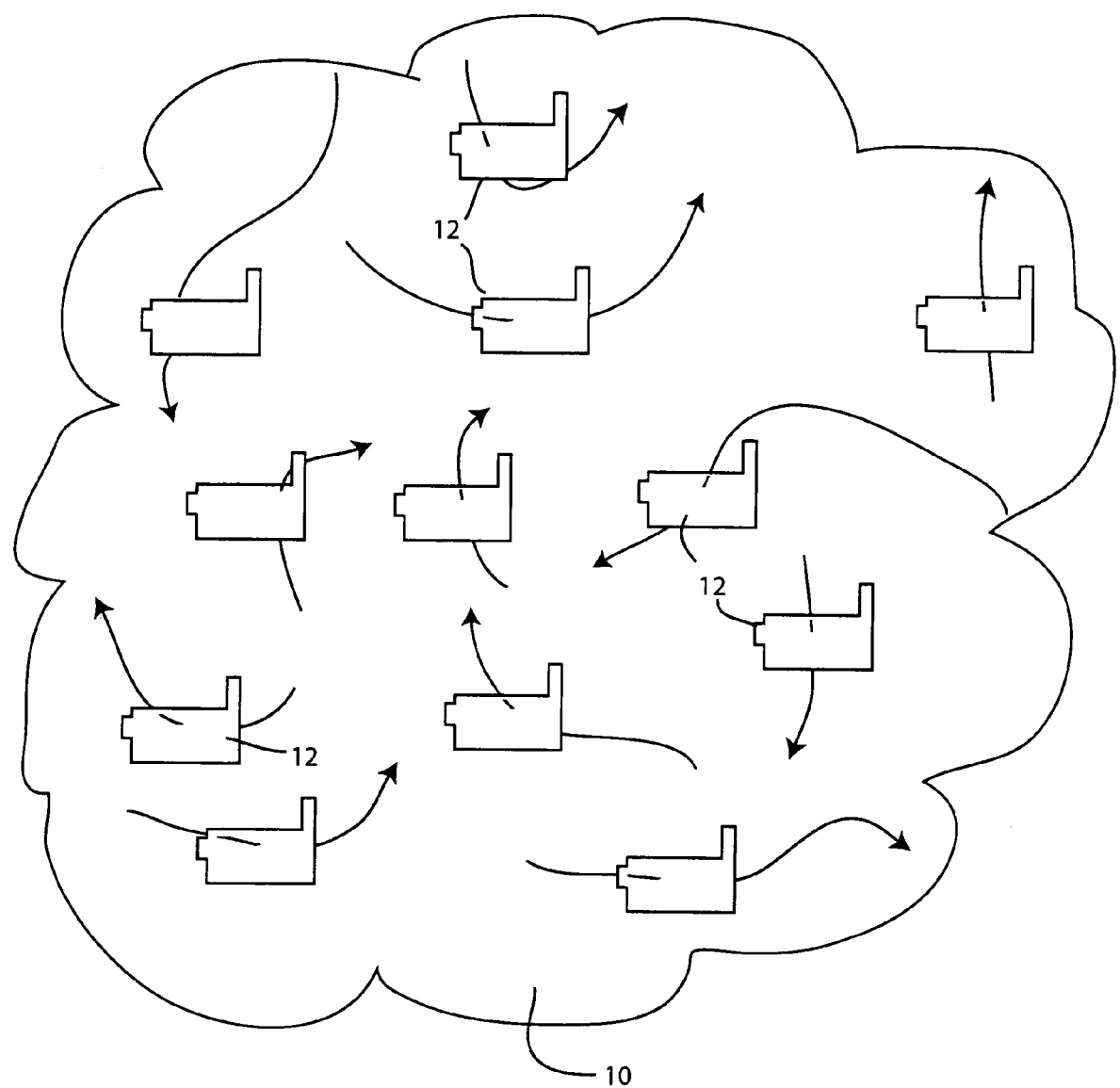
FIG. 1 is a network topology diagram useful in understanding the ad hoc network environment in which the secure content matching rendezvous architecture may be employed.

Referring to FIG. 1, an exemplary ad hoc network has been illustrated at 10. The network is comprised of a plurality of mobile nodes 12 that are configured to communicate with one another. In the ad hoc network these individual nodes are assumed to be highly mobile. Communication between nodes may be subject to high interference, as the nodes move in and out of range with respect to one another. In addition, the network model assumes that any given node may exhibit frequent on-off cycles. Thus ad hoc node 10 represents a mobile ad hoc network of the type that would be encountered where a plurality of roaming mobile devices interact to form a peer-to-peer network. By way of example, nodes 12 may be wireless transceiver devices operating according to a suitable wireless protocol, such as the 802.1X protocols (e.g., 802.11, 802.13, 802.16, . . . 802.20). Of course, the invention can be practiced using other types of communication protocols as well, with cellular communications protocols representing one very important one.

Figure 2:
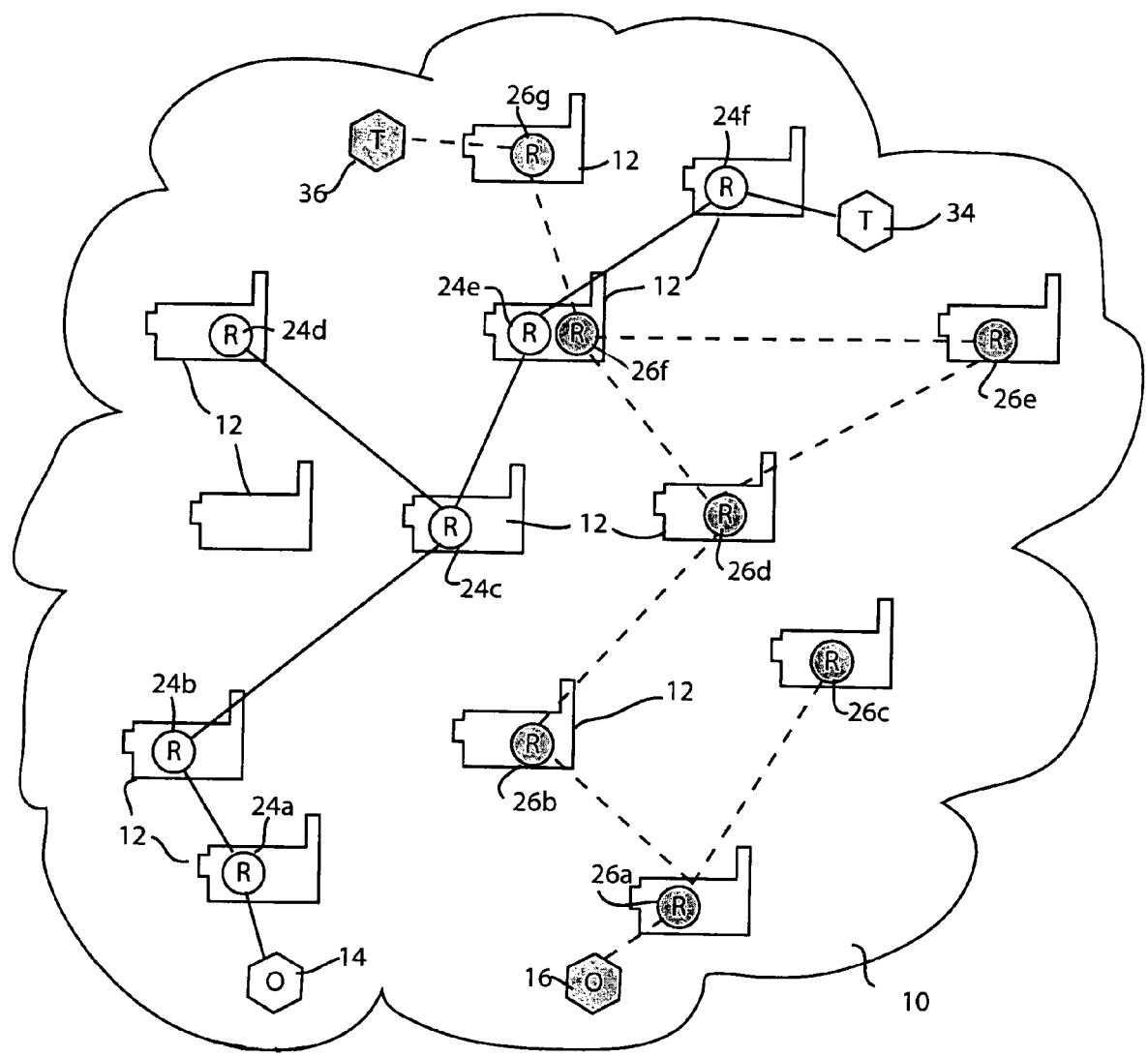
FIG. 2 is a network topology diagram illustrating how receptors propagate and route information between an originator and a target information source.

FIG. 2 shows how the communication is performed using mobile entities that we call receptors In a presently preferred embodiment, receptors are software agents that contain data structures to store payload and routing logic information and that are hosted by mobile nodes that make up the network. Receptors serve as vehicles to communicate information requests from an originator to a target information source and to further carry the reply information from the target back to the originator. As will be more fully described below, receptors employ embedded, encrypted routing logic that is local to each receptor. This routing logic controls the manner in which information is propagated over the mobile ad hoc network 10. Specifically, the routing logic is effected when two receptors reach within communication distance. The two receptors, following instructions and/or data carried by each take part in a contractual relationship to determine if the reply-bearing receptor will transfer the reply payload to the other.

In FIG. 2, two separate information requests have been illustrated, a first request originating from request originator 14 and a second request originating from request originator 16. The receptors are labeled in FIG. 2 as receptors 24a-24f that support the first information request (from originator 14). In FIG. 2 receptors 26a-26g carry the second request communication (corresponding to originator 16). The requests are propagated, as will be described, to the respective target information sources 34 and 36. Specifically, target 34 is the target of the request by originator 14 and target 36 is the target of the request by originator 16.

Communication starts from the originator (14 or 16 in FIG. 2). The originator creates multiple-unidirectional communication paths to its target node through multiple intermediate nodes 12. Semantically, this step may be implemented in a fashion similar to an HTTP request from a browser to an HTTP server. Multiple paths are created to increase the probability that the initial request will reach its destination, despite the fact that the ad hoc network 10 is inherently unreliable.

The originator scatters the receptor to network nodes so that the request for information will be propagated towards the target information source. The receptor contains information about the identity of the originator as well as one or preferably plural routing nodes that can relay the information back to the originator. The target is identified by a suitable uniform resource identifier (URI).

As the receptors propagate towards the target information source, eventually the target receives a receptor of the originator. The target checks for acceptance of the communication request and will then reply with the requested information by placing it in the receptor and routing the receptor and allowing the receptor to route the information back. Typically, the reply information will be in the form of information packets or blocks. The target will not know how the message will be delivered to the originator. The receptors handle this by routing the information back, relying on other network nodes that match the identity of the receptor (i.e., receptors that have patterns that correspond to the receptor currently carrying the reply information payload). The process of returning the information to the originator is performed iteratively. Each receptor is designed to relay information based on the assumption that the network topology may change even before a complete packet or block of information can be sent to the next node.

The reply information blocks (originating from the target information source) may be relayed to different nodes on the way back to the originator. In this case, the reply information block will meet up with or rendezvous with the receptor in different nodes. In essence, if a node carries a receptor that matches the receptor ID of the reply information block being forwarded, that receptor of like ID will take part in the information routing process. If the receptor ID does not match, the receptor will not take part in the information transfer. Each intermediate node where such a rendezvous takes place will route the information block based on a predefined routing logic contained in that receptor. The routing logic is local to the receptor, not to a router. Therefore, there is no need to standardize a router protocol. In general, an intermediate node where a rendezvous takes place will not know what method will be executed until the information block is received.

As the information blocks propagate throughout the system, each receiving node performs a pattern matching function to match the receptor ID specified in the information block with a set or pool of receptors that it has stored locally. If a match is detected, the node will activate the receptor function of the matching receptor, causing the information block to be routed through that receptor. Based on the logic of the receptor, the information block will be relayed to other nodes.

We call a routing path generated by the trace of receptors fired by the node to route the information block a "rendezvous path." Since the network topology changes rapidly the rendezvous path changes rapidly.

Figure 3:
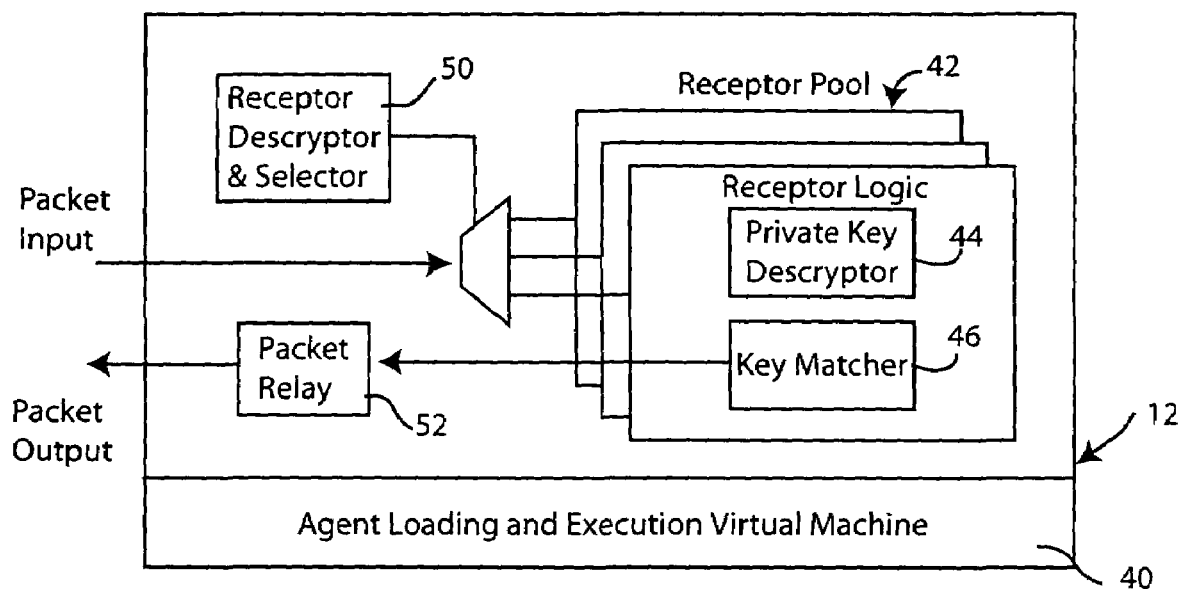
FIG. 3 illustrates a presently preferred receptor, specifically illustrating the routing logic employed by the receptor.

FIG. 3 shows the receptor processing architecture 12. In a presently preferred embodiment the receptors are configured as software agents that execute within a virtual machine hosted by a node. The lower level protocols used to load the agent and cause execution within the virtual machine are shown at 40. Because a given node can have a set of receptors (corresponding to different information requests from potentially different originators) the preferred architecture supports a receptor pool, shown generally at 42. Each receptor within the receptor pool includes a private key descriptor 44 and a key matcher 46. The receptor is configured to test an incoming packet using a receptor descriptor and selector function 50 to identify which, if any, of the receptors within the receptor pool matched the receptor ID of the incoming packet and other past the security challenge. Where a match and successful response to a challenge has been met, the packet relay function 52 sends the packet as output to the node having the matching and authenticated receptor. A packet level descriptor can be used to enable more secure packet level delivery of the receptor ID (encrypted and unencrypted).

Figure 4:
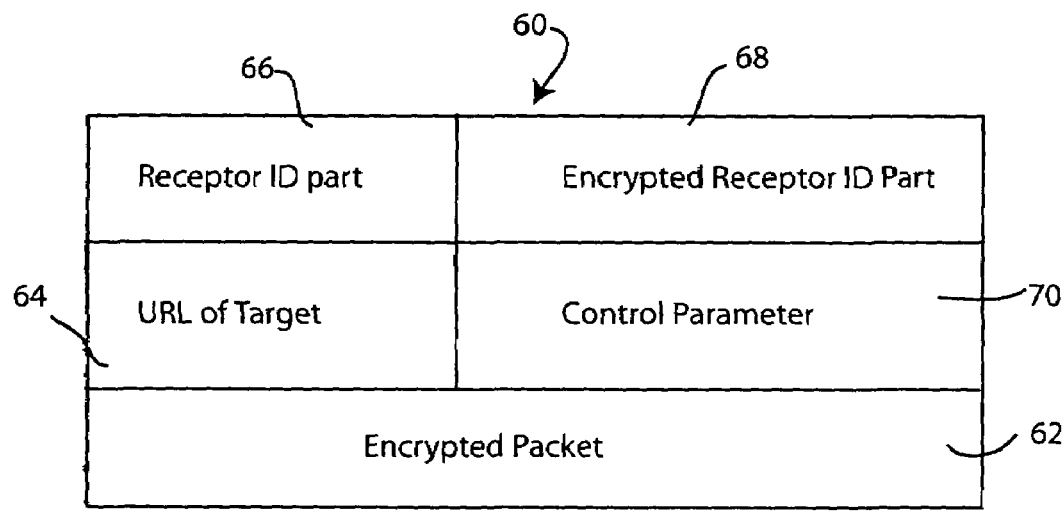
FIG. 4 is a data structure diagram illustrating an exemplary packet format of the type passed among receptors in a presently preferred embodiment.

A presently preferred data structure of an information packet is illustrated at 60 in FIG. 4. The payload of information to be delivered is stored, preferably as an encrypted packet at 62. The uniform resource locator associated with the target is stored at 64. The receptor ID is preferably constituted of two parts: a receptor ID part 66 and an encrypted receptor ID part 68. In addition, the preferred data packet includes a control parameter 70, used for data traffic control. Control parameter 70 may be used to implement traffic control. Typically the control parameters would be added by message assembly at the originating node. Examples of control parameters include a sequence number (based on an application requirement for a certain latency or throughput), an error correction parameter (such as a forward error correction or block error correction code) and a fan-in or fan-out control parameter (the originator controls fan-in and fan-out factors to adjust the error rate and throughput, as required).

In operation, each node installs a receptor using a service key that is only known to the service provider that authenticates the processing node. The receptor ID is partially encrypted (encrypted receptor ID part 68) to protect the privacy of the receptor. The unencrypted receptor ID part 66 can be used to find or identify receptors in the receptor pool efficiently for a reply information block to reduce the time needed to scan the receptors in the pool. This unencrypted receptor ID field can be used to identify the receptor type and other none-private information to facilitate the receptor execution virtual machine to manage different types of receptors. The target information source receives a public key of the receptor and can only be decrypted by a private key in the receptor. The unencrypted receptor ID part 66 is thus used only to make routing more efficient for propagating messages back to the originating node. Other types of encryption mechanisms can also be used to protect the privacy of the receptor.

Each mobile node passes information blocks to a subset of the receptors. Referring to FIG. 3, each receptor decrypts in parallel to decide whether the information block of the input packet contains the correct receptor ID. If it does, the receptor gets the encrypted information block and sends it to other neighboring nodes that have a similar ID-matching receptor.

Referring to FIG. 2, the originator deploys receptors over the network nodes according to a user-definable method that may be installed or instantiated by the user dynamically to suit each application. In one presently preferred embodiment the originator uses an arbitrary deployment method that scatters receptors to network nodes based on a set of user preferences. For example, the deployment strategy can, according to user preference, broadcast to all nodes using a spanning tree algorithm. By way of further example, the deployment strategy can scatter receptors to selected nodes based on node ID. For a railway deployment, the receptor can be deployed to interleaved, fixed nodes, so that an intelligent method can be utilized to distribute load between users among different accessible nodes and traffic relay between nodes.

The communication method will support anonymous authorized receptors with a high level of security being maintained. Unlike a conventional internet session that contains source and destination IP addresses, receptors do not need to contain IP addresses and port information of the originator and target. Thus a third party can create an anonymous receptor, suitable authenticated, to ensure that messages contained in that receptor are protected from unauthorized reading while they are en route. Moreover, the message cannot trigger any operation that would affect operation of the node. Receptors are not aware of other receptors in the same mobile node. In FIG. 2, for example, two receptors happen to be stored in a common node at 100. The architecture of the system provides isolation of messaging and operation execution in the node and among the receptors.

When a receptor receives messages that are larger than the maximum fan-in factor, or that do not match any receptor in the node, then it is possible that the message is unsolicited, possible from an intruder. Upon receipt of such messages, the node simply drops the message and can optionally propagate an intruder alert back to the originator.

Because the architecture relies upon the scattering of receptors across the network, in some implementations it may be desirable to control the manner in which the node deployment takes place. In a presently preferred implementation, the receipt of a receptor from a neighboring node would result in the data being passed to receptors in other neighboring nodes based on a minimal spanning tree or other suitable algorithm to prevent excessive cycles before the payload reaches the sender. Fan-outs are limited by a configurable maximum fan-out parameter. By limiting the fan-out factor it is possible to limit the number of paths to the target on a statistical basis.

Receptors do use node resources. Therefore an implementer may want to give consideration to prevent flooding of the network. One method to prevent flooding is to employ a lifetime or lease-time indicia for each receptor. The lifetime indicia controls the duration that the receptor is allowed to exist after it is first deployed. The lease-time indicia controls the time that a node will allow the receptor to stay resident at its location. An application can generate refresh messages to refresh the lifetime of a receptor. In contrast, the lease-time would be negotiated with the node through a service provider. In an exemplary implementation, the system designer might use a lifetime indicia to fine tune network performance after taking measurements of network flooding conditions. The lease-time indicia could be used for a similar purpose, although the lease-time indicia supports more sophisticated network models where different users can contract for different levels of service.

If desired, the ad hoc network can be architected using receptors to allow a service provider to deploy customized receptors for their network. The receptor could also be further customized by the end user. Generally, operations impacting routing of information between nodes would likely be controlled only by the service provider, whereas information related to data security and encryption might be customized by end users. By allowing customized receptors, a given ad hoc network is capable of supporting different types of information systems concurrently. For example, a business entity might be led to utilize customized receptors having special parameters that will only work with their information system. Although the receptors have been customized, they will nevertheless be capable of propagation across the mobile ad hoc network, along with receptors of other users that have not been similarly customized. Because the individual receptors are unaware of each other, both customized and non-customized information systems can coexist without interfering with each other.

The routing logic depicted in FIG. 3 can readily ride on top of a standard TCP/IP protocol and may take advantage of domain name services (DNS), universal description, discovery and integration (UDDI) protocols and active directory capabilities over both IPv6 and IPv4 networks to maintain compatibility. Although the protocol is not dependent upon a firewall or network address translation, it has significant advantage in providing secure communication over firewalls and using network address translation. Receptors can be created dynamically outside a firewall or system employing network address translation. Each communicating party can set up a target and originator pair. This pair forms a complementary, bidirectional communication path that is inherently quite secure. Each communicating party can refer to the URI to get a message and then post a message to that URI location. Moreover, application proxy can be implemented using a receptor to get a message from an IP port and then relay that message to other receptors through an IP port. This processing capability allows for multiple applications to use an IP port to communicate with each other. Receptors can use the HTTP protocol above the internet protocol to tunnel the traffic.

While a variety of implementations are possible, one presently preferred embodiment uses a simplified XML page block model for low layer message routing. In this embodiment, data is modeled as XML page blocks logically. The pages can be referred to by other applications using HTTP protocols. XML pages can be mapped into fixed size physical page blocks, similar to RTP traffic patterns, to facilitate real time routing and to implement quality of service (QoS). These blocks are encrypted at the application level and are delivered through a set of randomly generated paths. The page block can also be compressed before delivery. On the receiving site, the page is opened using an encryption key and decompressed in the application. There is no need for the lower layer to conduct transparent encryption (such as using IPSEC or SSL VPN). However, a fast decryption accelerator can enhance the performance. The main function of this encryption is to make the source and destination invisible to the network node. It can also help protect the message block. Higher level protocols, such as in payloads for SOAP and SIP, are supported directly through the HTTP transport. The receptor is HTTP aware, in the sense that it assumes that HTTP requests will generate a network of receptor and that the response will be the information blocks. Subsequent operation within the HTTP session could be supported through the dynamically deployed receptors deployed to the node that flows in and out of the communication paths between the originator and the target. For one request, a large amount of data blocks can be delivered as reply blocks. Media protocols such as RTP and RTSP are modeled as MPEG XML descriptors with input/output primitives for real time media delivery. Media are directly retrieved from the descriptor and delivered in compressed blocks. In this case, the information block can be a frame or subframe MPEG or JPEG video.

Each receptor can receive multiple information blocks with the same or different ID to identify subpaths. A receptor can be deleted immediately or it can be removed through subsequent garbage collection based on reference or timeout.

The architecture will also support secure and private communication at the routing level. To illustrate, the target can be modeled as an XML identity of the originator is not known to the intermediate nodes in the communication path. Intermediated nodes get a receptor and the result of receptor execution is not known to the node. The originator specifies how the receptor will be encrypted. As this is not known to the routing nodes, application privacy is enhanced. Only the receptor from the originator will route information back to the originator using multiple paths. All of the unsolicited information are dropped or logged for intrusion detection. Each receptor has fan-out and fan-in factors which control the degrees of redundancy for the rendezvous path. The rendezvous path is non-deterministic in terms of topology. As a result, it is difficult for a wireless sniffer to find out what the end points are.

The communication system made possible by the receptor architecture can be deployed in a variety of different mobile ad hoc networks. In one example of such network the mobile nodes are deployed in moving vehicles traveling along a roadway. The communication system would then be used to allow an originator in the one vehicle to request information from an information target located out of immediate range of that vehicle's transceiver, but nevertheless reachable via the ad hoc network. Such traffic along a roadway represents a special case of ad hoc network, where the mobile traffic follows a set of predetermined paths (following highway routes). This means that, statistically, the information flow will propagate along those predetermined paths. Other examples of ad hoc network that would statistically follow a predetermined path include communications along a railway and along a power transmission grid. In addition, while mobile traffic along a roadway represents one class of applications, the rendezvous routing techniques of the invention are readily extended to hybrid systems where fixed location routers are also employed.

To further illustrate the "controlled path" application, consider the problem of handling message traffic along a highway or on a moving train. Such an embodiment might place routers with the said rendezvous receptor routing functions (referred to as R3 Router) along a fixed path and install additional routers in each of the moving trains or cars. We can define a radio cell as an area where mobile antennas can reach each other bi-directionally. Roaming objects move at extremely high speed, but within the ability for the set of antennas to detect the signal and decode the signal with an acceptable error rate. The node between multiple cells is configured to relay messages to different cells. Receptors are loaded into the nodes and users have access to the receptor software downloaded from a service provider to access the network. Objects move at high speed across the path and objects may communicate with each other directly.

This model would be readily customizable for use on high speed trains such as the bullet train. Each train contains an R3 Router. Along the railway there are fixed R3 Routers. Gateways to Internet can be allocated at the stations or a distance that is engineered according to the average distance of the train and the station. The R3 Router is suitable for very high speed moving train for the following reasons: (i) the receptors deployed by the train in the moving direction along the railway is ready to delivery the reply to the originator, which ensures that there will be receptors that can send the reply back to the originator no matter how fast the train passes from one fixed R3 router to another; (ii) two crossing trains can rely on receptors between the train to relay the messages and, since the receptor propagates faster than the train moves, the receptors that can relay the messages along the railway are longer than the distance between the train. Therefore, although the train moves apart, there are always receptors that can relay the messages for the moving trains.

In the preceding examples, the physical communication was handled by a wireless system. While TCP/IP based networks represent one important class of systems with which this invention may be used, it should be appreciated that the principals are readily extended to other types of ad hoc networks. An important example of such is the cellular communication network. In a cellular telephone system, a conversation between two parties can be modeled as communications between two sets of originators and targets. Each party to the conversation would thus launch a receptor into which the speaking party's message would be placed at the target side. By allowing each party play as both originator and target roles, a two-way communication can be supported.

Moreover, in addition to more conventional "communication" systems, the principals of the receptor technique can be used to support information systems such as sensor networks, where data from plural, distributed sensors is communicated among each other in a peer-to-peer or client-server model. The communication system employing receptor technology suits this application well, as it may be important to support sensor networks where individual sensors (node) may be switched off, or may lose communication from time to time. Also, it may be important, for security reasons, to be able transfer data from one sensor without other nodes being able to decrypt and access that data.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for supporting information transfer in a network, comprising:

a plurality of nodes;

an originator initiating communication with a target at a target node by propagating instances of an first intelligent receptor entity representing a request to one or more of the plurality nodes in the network, wherein each of the nodes receiving an instance of the first intelligent receptor entity installs another instance of the first intelligent receptor entity on that node and the installed instance resides on that node, wherein said first intelligent receptor entity eventually reaches the target node via multiple paths, and wherein the target, upon receiving at least one of the instances of the first receptor entity, generates a reply information packet having a first receptor ID associated with the first intelligent receptor entity and places the reply information packet in the at least one instance, wherein the at least one instance broadcasts the packet to nearby nodes that are a part of the plurality of nodes, wherein at least one of the nearby nodes matches the first receptor ID with at least one instances of an intelligent receptor entity and installed on the at least one nearby node, and wherein a matched instance of the first intelligent receptor entity and installed on the at least one nearby node broadcasts at least part of the packet to nearby nodes of the at least one nearby node, wherein the at least part of the reply information packet eventually is relayed to said originator by at least one of the instances, of the first intelligent receptor entity, each installed and residing on a node of the plurality of nodes;

wherein an instance of the first intelligent receptor entity and that is dynamically installed at a first node of the plurality of nodes propagates another instance of the first intelligent receptor entity to a nearby node of the first node;

wherein each of the instances of the first intelligent receptor entity serves as an rendezvous logic for matching the first receptor ID in the reply information packet and executes a predefined broadcasting logic to broadcast the reply information packet.

2. The system of claim 1 wherein said network is a mobile ad hoc network and said first receptor entity includes an agent loading mechanism that installs an instance of the first receptor entity on one or more of the plurality of nodes dynamically when said originator initiates requests to the target.

3. The system of claim 1, wherein said first receptor entity is one of multiple types of receptor entities, wherein the multiple types of receptor entities each are pre-authorized to protect routing function integrity and support various types of usage management functions, wherein using the multiple types of receptor entities supports multiple routing algorithms for packet relay to adapt to different application requirements relating to reliability, privacy, and quality of services.

4. The system of claim 1, wherein said first receptor entity includes a data store for storing a pool of data sets corresponding to information about a plurality of receptor entities.

5. The system of claim 1, wherein said first receptor entity includes a data structure to store at least one control parameter used in mediating propagation of said reply information.

6. The system of claim 5, wherein said control parameter is a lifetime parameter used to terminate an associated receptor entity after lapse of a predetermined time.

7. The system of claim 5, wherein said control parameter is a lease-time parameter used by a third party entity to control a lifetime of an associated receptor entity.

8. The system of claim 5, wherein said first receptor entity is hosted by mobile nodes within the network, and wherein the control parameter is one or more of a fan-in parameter and a fan-out parameter that selectively controls to which nodes said receptor entity may propagate.

9. The system of claim 1, wherein said first receptor entity is adapted to travel over multiple types of network nodes with a common virtual execution environment overlaying a physical network that is one or more of: a low level radio network; an internet protocol based wireless network; and a cellular communication network.

10. The system of claim 1, wherein said first receptor entity is adapted to travel over a sensor network comprised of plural sensors adapted to report sensor readings.

11. The system of claim 1, wherein said network is defined by plural mobile nodes each capable of simultaneously hosting plural receptor entities.

12. The system of claim 1, wherein said reply information is stored in a data structure within said receptor entity in an encrypted fashion.

13. The system of claim 9, wherein said reply information is stored in said data structure within said first receptor entity in an encrypted fashion using a security key such that only said originator can decrypt said reply information placed there by the target.

14. The system of claim 1, wherein the first intelligent receptor entity has:

a logic data structure storing a security key generated by said originator;

a logic data structure storing reply information supplied by the target;

a packet relay mechanism to propagate the first intelligent receptor entity to nearby nodes; and a descriptor and selector that parses an input packet and selects a receptor entity to further process the input packet based on the receptor ID.

15. The system of claim 14, wherein said packet relay mechanism employs logic to dynamically propagate the receptor entity to form multiple possible connection paths in real time, thereby reducing probability of network isolation between said originator and the target when the intermediate nodes one or more of: (a) change location; and (b) cease to function at high rates.

16. The system of claim 1, wherein the at least part of the reply information packet eventually is relayed to said originator exclusively by at least one of the instances, of the first intelligent receptor entity, each installed and residing on a node of the plurality of nodes.

17. The system of claim 1, wherein each of the instances of the first intelligent receptor entity and at one of the plurality of nodes broadcasts additional instances of the first intelligent receptor entity to all nodes that are reachable by that node through methods independent of existing low level protocols at that node.

18. The system of claim 1, wherein each of the instances of the first intelligent receptor entity exclusively uses a routing logic local to that instance for broadcasting the reply information packet.

19. In a mobile ad hoc network, a method of transferring information among an originator and a target comprising the steps of:

launching instances of a receptor entity by the originator into said network, the instances each being propagated from the originator to the target by intermediate nodes that make up the network, wherein each of the intermediate nodes receiving an instance of the receptor entity installs another instance of the receptor entity on that node and the installed instance resides on that node;

at the target, inserting reply information into an instance of the receptor to constitute a reply-relay receptor, the reply information being propagated from the target to the originator by the reply-relay receptor based on propagation logic carried by said reply-relay receptor; and a) propagating the reply information to at least some of the intermediate nodes that were involved in propagating the instances of the receptor entity to the target and b) using the instances, of the receptor entity, installed and residing at the at least some of the intermediate nodes to participate in carrying out the propagation logic carried by said reply-relay receptor, wherein the reply information eventually is relayed to the originator by at least one of the instances, of the receptor entity, each installed and residing on one of the intermediate nodes;

wherein an instance of the first intelligent receptor entity and that is dynamically installed at a first node of the plurality of nodes propagates another instance of the first intelligent receptor entity to a nearby node of the first node;

wherein each of the instances of the first intelligent receptor entity serves as a rendezvous logic for matching the first receptor ID in the reply information packet and executes a predefined broadcasting logic to broadcast the reply information packet.

20. The method of claim 19 further comprising:
selecting the instances, of the receptor entity, installed and residing at the at least some of the intermediate nodes by selecting instances, of receptor entities, that have predetermined patterns that match patterns defined in said reply-relay receptor.

21. The method of claim 19 further comprising encrypting the reply information at said target, using an encryption key supplied from the originator and carried by said receptor.

22. The method of claim 20 wherein said reply information is encrypted using an encryption key supplied by the originator and wherein said predetermined patterns are assessed for match without revealing decrypted content of the reply information at the intermediate nodes.

23. The method of claim 19 wherein said receptor entity is propagated into the network of nodes containing a virtual execution environment that can load and execute the instances of the receptor entity by multicasting from the originator.

24. The method of claim 19 wherein the originator controls bandwidth and/or packet loss over the network by controlling a number of times receptor entities are launched.

25. The method of claim 19 wherein said receptor entity has a predetermined lifetime before it is refreshed by reply messages.

26. The method of claim 19 wherein said receptor entity includes control fan-in/fan-out parameters that mediate to which nodes within the network the instances of the receptor entity may propagate.

27. A system for supporting information transfer in a network, comprising:

a plurality of nodes;

an originator initiating communication with a target at a target node by propagating instances of an first intelligent receptor entity representing a request to one or more of the plurality nodes in the network, wherein each of the nodes receiving an instance of the first intelligent receptor entity installs another instance of the first intelligent receptor entity on that node and the installed instance resides on that node, wherein said first intelligent receptor entity eventually reaches the target node via multiple paths, and wherein the target, upon receiving at least one of the instances of the first receptor entity, generates a reply information packet having a first receptor ID associated with the first intelligent receptor entity and places the reply information packet in the at least one instance, wherein the at least one instance broadcasts the packet to nearby nodes that are a part of the plurality of nodes, wherein at least one of the nearby nodes matches the first receptor ID with at least one instances of an intelligent receptor entity and installed on the at least one nearby node, and wherein a matched instance of the first intelligent receptor entity and installed on the at least one nearby node broadcasts at least part of the packet to nearby nodes of the at least one nearby node, wherein the at least part of the reply information packet eventually is relayed to said originator by at least one of the instances, of the first intelligent receptor entity, each installed and residing on a node of the plurality of nodes;

wherein each of the plurality of nodes implements a virtual machine that runs an agent and that is operable to host a plurality of instances of a plurality of intelligent receptor entities as a receptor pool, wherein the receptor pools at the plurality of nodes collectively support request and response operations between the originator and the target and act as rendezvous points of a rendezvous operation that matches and relays the reply information packet requested by the originator;

wherein the reply information packet contains unencrypted part and encrypted part of the first receptor ID, URL of the target, control parameters, and encrypted payload, wherein the agent, at each of the plurality of nodes receiving the reply information packet, performs a) a fast matching of the first receptor ID with the receptor pool at that node using the unencrypted part of the first receptor ID and b) activates a matched instance of an intelligent receptor entity from the receptor pool at that node, wherein the activated instance executes a separate receptor logic to optimize the statistical characteristic of the rendezvous operation for each request and reply operation and for each reply information packet.

28. A system for supporting information transfer in a network, comprising:

a plurality of nodes;

an originator initiating communication with a target at a target node by propagating instances of an first intelligent receptor entity representing a request to one or more of the plurality nodes in the network, wherein each of the nodes receiving an instance of the first intelligent receptor entity installs another instance of the first intelligent receptor entity on that node and the installed instance resides on that node, wherein said first intelligent receptor entity eventually reaches the target node via multiple paths, and wherein the target, upon receiving at least one of the instances of the first receptor entity, generates a reply information packet having a first receptor ID associated with the first intelligent receptor entity and places the reply information packet in the at least one instance, wherein the at least one instance broadcasts the packet to nearby nodes that are a part of the plurality of nodes, wherein at least one of the nearby nodes matches the first receptor ID with at least one instances of an intelligent receptor entity and installed on the at least one nearby node, and wherein a matched instance of the first intelligent receptor entity and installed on the at least one nearby node broadcasts at least part of the packet to nearby nodes of the at least one nearby node, wherein the at least part of the reply information packet eventually is relayed to said originator by at least one of the instances, of the first intelligent receptor entity, each installed and residing on a node of the plurality of nodes;

wherein the network is a mobile ad hoc network, wherein the plurality of nodes support simple media broadcasting function independent of existing route discovery mechanism in the mobile ad hoc network, wherein the system farther includes an agent loading and authentication mechanism that loads a trusted software agent to support a) installation of an instance of intelligent receptor entities into a receptor pool at one of the plurality of nodes and b) selecting an instance of a receptor entity from the receptor pool at that node by matching that instance with the first receptor ID in the reply information packet independent of existing mobile ad hoc network protocols in the mobile ad hoc network.

* * * * *